(12) United States Patent
Hoshino et al.

(10) Patent No.: US 7,061,727 B2
(45) Date of Patent: Jun. 13, 2006

(54) MAGNETORESISTIVE HEAD USING MULTILAYERED VARISTOR MATERIAL

(75) Inventors: Katsumi Hoshino, Matsuda (JP); Hiroyuki Hoshiya, Odawara (JP)

(73) Assignee: Hitachi, Ltd., Tokyo (JP)

( * ) Notice: Subject to any disclaimer, the term of this patent is extended or adjusted under 35 U.S.C. 154(b) by 660 days.

(21) Appl. No.: 09/940,517

(22) Filed: Aug. 29, 2001

(65) Prior Publication Data

US 2002/0085317 A1 Jul. 4, 2002

(30) Foreign Application Priority Data

Dec. 28, 2000 (JP) ............................. 2000-400887

(51) Int. Cl.
*G11B 5/31* (2006.01)
*G11B 5/39* (2006.01)

(52) U.S. Cl. ..................................... 360/320
(58) Field of Classification Search ................ 360/320, 360/321, 322, 323, 327.21, 328, 324.1, 324.11, 360/324.12

See application file for complete search history.

(56) References Cited

U.S. PATENT DOCUMENTS

| | | | | |
|---|---|---|---|---|
| 4,317,149 A | * | 2/1982 | Elser et al. | 360/126 |
| 4,800,454 A | * | 1/1989 | Schwarz et al. | 360/234.5 |
| 5,712,747 A | * | 1/1998 | Voldman et al. | 360/234.4 |
| 5,805,390 A | * | 9/1998 | Takeura | 360/323 |
| 6,181,531 B1 | * | 1/2001 | Koshikawa et al. | 360/294.4 |
| 6,477,006 B1 | * | 11/2002 | Sato | 360/317 |

FOREIGN PATENT DOCUMENTS

| | | | |
|---|---|---|---|
| EP | 0651375 | | 5/1995 |
| JP | 05283208 A | * | 10/1993 |
| JP | 06-052517 | | 2/1994 |
| JP | 7-169005 | | 7/1995 |
| JP | 08-045033 | * | 2/1996 |
| JP | 09-198619 | | 7/1997 |
| JP | 11-265503 | * | 9/1999 |

OTHER PUBLICATIONS

Wu et al. "ESD Protection of GMR Heads in Manufacturing." 1999. SAE Magnetics (HK) Ltd. EOS/ESD SYMPOSIUM. pp. 99-315 to 99-318.*

(Continued)

*Primary Examiner*—George J. Letscher
*Assistant Examiner*—Christopher R. Magee
(74) *Attorney, Agent, or Firm*—Mattingly, Stanger, Malur & Brundidge, P.C.

(57) ABSTRACT

A magnetoresistive includes a magnetoresistive layer which converts magnetic signals to electric signals and a pair of electrodes for allowing an electrically sensing current to flow across the magnetoresistive layer is made between an upper shield and an under shield with upper gap layer and under gap layer intervening between the magnetoresistive layer and the shields. By using a multi-layered varistor film or films of a material such as ZnO, SiC, SrTiO, Si etc. in combination with an insulating material SiO2, A1203, etc. to connect the magnetoresistive element to the shields and interconnect both electrodes, a magnetoresistive head which withstands breakdown even if the insulating gap layers are made thinner is provided.

8 Claims, 15 Drawing Sheets

OTHER PUBLICATIONS

IBM Technical Disclosure Bulletin. "Magnetoresistive Head with Integrated Varistor for ESD/EOS Protection." Apr. 1, 2000. IBM. Issue No. 432. Page No. 751.* IBM Technical Disclosure Bulletin. "Magnetoresistive Head with Integrated Varistor Employing Combined Varistor, Antiferromagneti Seed/Gap and Grounded First Shield." Apr. 1, 2000. IBM. Issue No. 432. Page No. 751.*

* cited by examiner

|  | 5V | 10V |
|---|---|---|
| EMBODIMENT | 98% | 97% |
| PRIOR ART | 88% | 72% |

FIG. 12A
FIG. 12B
FIG. 12C
FIG. 12D
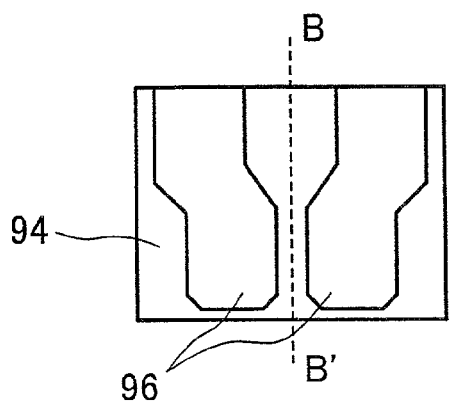
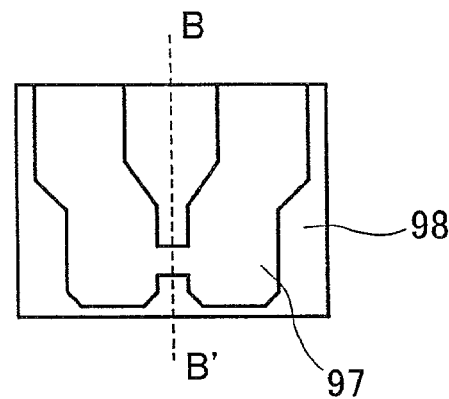
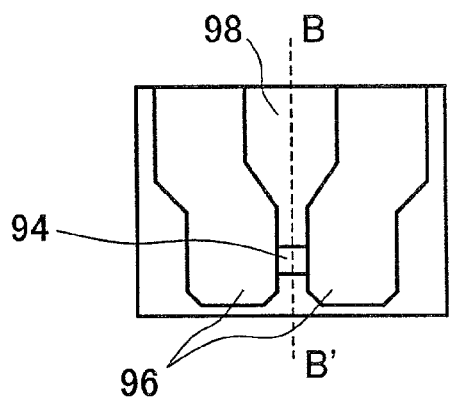
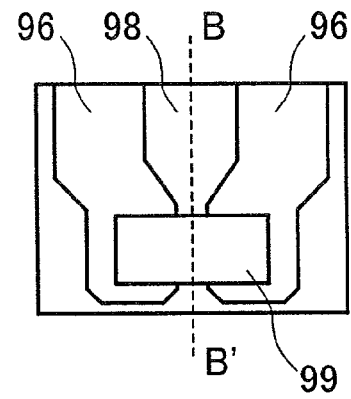
FIG. 12E
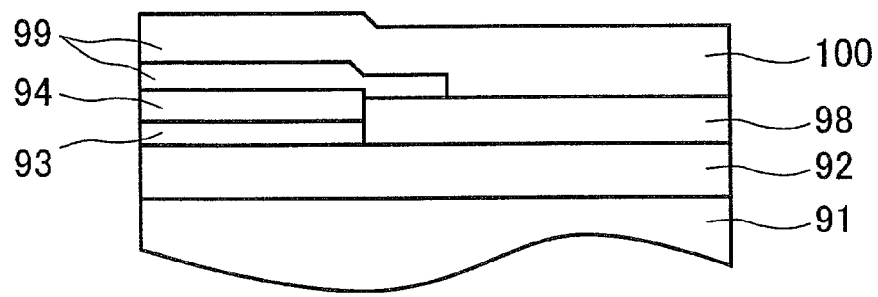

MAGNETORESISTIVE HEAD USING MULTILAYERED VARISTOR MATERIAL

BACKGROUND OF THE INVENTION

1. Field of the Invention

The present invention relates to magnetic heads, particularly magnetoresistive heads performing well even for high magnetic recording density, a method of producing these heads, and magnetic read/write devices.

2. Description of the Related Art

Magnetic recording disk drives which are commonly used now employ read/write separate heads; that is, recording is performed by an inductive thin film head and reading back is performed by a magnetoresistive head. The magnetoresistive head uses the magnetoresistive effect that electrical resistance changes, depending on the external magnetic field. is shown in FIG. 2, the magnetoresistive head is comprised of a magnetoresistive element consisting of a magnetoresistive layer 14, magnetic domain control layers 15, and electrodes 16; upper and under layers 12, 18 and elements for blocking out an unnecessary magnetic field, one of which forms a layer covering the magnetoresistive element and the other forming an under layer; and upper and under gap layers (insulating layers) 13, 17 for isolating the magnetoresistive element from the shield layers, wherein A1203 films are mainly used as the gap layers (insulating layers).

As recording density is becoming denser, the spacing between the upper and under layer decreases accordingly, and consequently, the thickness of the insulating gap layers, each inserted between the magnetoresistive element and each shield, becomes thinner. Consequently, static electricity or electrical stress causes overcurrent to flow between the electrodes of the magnetoresistive element or between the magnetoresistive element and each shield, making the magnetoresistive element liable to break down. To address this trouble, some methods for improving the dielectric strength by grading up the quality of the insulating layers have been disclosed; e.g., a method of laminating SiO2 and Si3N4 layers, set forth in Japanese Patent Laid-Open Publication No. Rei 6-52517 and a method of aluminum oxidation by heat application, set forth in Japanese Patent Laid-Open Publication No. Rei 9-198619. Moreover, some methods for bypassing overcurrent so that it will not flow across the magnetoresistive element or between the magnetoresistive element and each shield have been disclosed; e.g., a method of connecting the magnetoresistive element to the ground basis by Schottky diodes, set forth in Japanese Patent Laid-Open Publication No. Rei 7-169005; and a method of connection using varistor material set forth in Japanese Patent Laid-Open Publication No. Hei 8-45033 and Japanese Patent Laid-Open Publication No. Hei 11 265503.

SUMMARY OF THE INVENTION

To increase the resolution of the magnetoresistive head for magnetic recording at higher density, it is necessary to narrow the spacing between the upper and under layer and make the insulating gap layers thinner. However, this poses a problem that the resulting electrostatic field causes the breakdown of the magnetoresistive layer if the dielectric strength is weak.

As the material of the above-mentioned insulating gap layers, the A1203 films which are mainly used and other materials such as a lamination consisting of SiO2 and Si3N4 film layers are known. However, these materials have a drawback that the dielectric strength decreases as the insulating layer thickness decreases. For the method of forming short-circuits between the magnetoresistive element and the shields by using the materials exhibiting diode or varistor characteristics or the like, which was set forth in Japanese Patent Laid-Open Publication No. Hei 7-169005 and Japanese Patent Laid-Open Publication No. Hei 11-265503, the following problems were posed. It is difficult to form a thin film having the properties strong enough to prevent the breakdown of the head. In addition, the method of producing this thin film is difficult in the head production process.

An object of the present invention is to provide a magnetic head (magnetoresistive head), its material, a method of producting the head, and a magnetic read/write device using the head, thereby enabling that the breakdown of the magnetoresistive element of the magnetoresistive head is prevented even when the spacing between the upper and under layers of the element is narrowed and the insulating gap layers are made thinner for magnetic recording at higher density.

According to an aspect of the present invention, the object of the present invention is achieved by a magnetoresistive head comprising a magnetoresistive layer which converts magnetic signals to electric signals, a pair of electrodes for allowing an electrically sensing current to flow across the magnetoresistive layer, upper and under gap layers placed over and beneath the pair of electrodes and the magnetoresistive layer, and upper and under layers, one of which placed over the upper gap layer and the other placed beneath the under gap layer, wherein the pair of electrodes and at least either of the upper and under layers are electrically connected by varistor material that also interconnects the pair of electrodes.

According to another aspect of the present invention, the object of the present invention is achieved by a magnetoresistive head comprising a magnetoresistive layer which converts magnetic signals to electric signals, a pair of electrodes for allowing an electrically sensing current to flow across the magnetoresistive layer, upper and under gap layers placed over and beneath the pair of electrodes and the magnetoresistive layer, and upper and under layers, one of which placed over the upper gap layer and the other placed beneath the under gap layer, wherein at least either of the upper and under gap layers is made of varistor material.

According to a further aspect of the present invention, the object of the present invention is achieved by a magnetoresistive head comprising a magnetoresistive layer which converts magnetic signals to electric signals, a pair of electrodes for allowing an electrically sensing current to flow across the magnetoresistive layer, upper and under gap layers placed over and beneath the pair of electrodes and the magnetoresistive layer, and upper and under layers, one of which placed over the upper gap layer and the other placed beneath the under gap layer, wherein leads of the upper and under layers and leads extended out of lead terminals of the electrodes are connected by varistor material on the side where a magnetoresistive element does not exist, when viewed from the lead terminals of the pair of electrodes.

According to yet another aspect of the present invention, the object of the present invention is achieved by a magnetoresistive head comprising a magnetoresistive layer which converts magnetic signals to electric signals, a pair of electrodes for allowing an electrically sensing current to flow across the magnetoresistive layer, upper and under layers placed over and beneath the pair of electrodes and the magnetoresistive layer, and upper and under layers, one of which placed over the upper gap layer and the other placed beneath the under gap layer, wherein the magnetic domain control layers and electrodes are connected via varistor material to the upper and under layers.

According to a still further aspect of the present invention, the object of the present invention is achieved by a magnetoresistive head comprising a magnetoresistive layer which converts magnetic signals to electric signals, a pair of electrodes for allowing an electrically sensing current to flow across the magnetoresistive layer, upper and under gap layers placed over and beneath the pair of electrodes and the magnetoresistive layer, and upper and under layers, one of which placed over the upper gap layer and the other placed beneath the under gap layer, wherein at least a part of the head surrounded by the electrodes and the magnetoresistive element is made of varistor material and the upper and under layers are connected by material exhibiting the varistor characteristics.

According to yet another aspect of the present invention, the object of the present invention is achieved by a method of producing a magnetoresistive head in which, after the magnetoresistive layer of the magnetoresistive head is patterned in the direction of the element height, space is filled with the varistor material, thereby connecting the magnetoresistive element and the upper and under layers.

According to a still further aspect of the present invention, the object of the present invention is achieved by a magnetoresistive head in a magnetic device comprising a multilayer which has two or more magnetic layers separated by one or more non-magnetic layers and performs magnetic sensing by taking advantage of current change depending on the relative magnetization directions of the magnetic layers, a pair of magnetic domain control layers provided on either sides of the multilayer to apply a longitudinally bias magnetic field in order to inhibit a Barkhausen noise, a pair of electrodes placed over and beneath the multilayer for allowing an electrically sensing current to flow across the laminate in the perpendicular direction, insulating gap layers for isolating the upper and lower electrodes, and upper and under placed so as to sandwich the multilayer therebetween, the magnetoresistive head employing a diode, transistor, or varistor material inserted or filled between the upper and under layers or the upper and lower electrodes.

According to yet another aspect of the present invention, the object of the present invention is achieved by a magnetoresistive head in a magnetic device comprising a multilayer which has two or more magnetic layers separated by one or more non-magnetic layers and performs magnetic sensing by taking advantage of current change depending on the relative magnetization directions of the magnetic layers, a pair of magnetic domain control layers provided on either sides of the multilayer to apply a longitudinally bias magnetic field in order to inhibit the Barkhausen noise, a pair of electrodes placed over and beneath the multilayer for allowing an electrically sensing current to flow across the laminate in the perpendicular direction, insulating gap layers for isolating the upper and lower electrodes, and upper and under placed so as to sandwich the multilayer therebetween, the magnetoresistive head employing a diode, transistor, or varistor material via which the upper and under shields or the electrodes are connected to at least either the top surface or the bottom surface of the magnetic domain control layers.

According to yet another aspect of the present invention, the object of the present invention is achieved by the above magnetoresistive head employing a material consisting of ZnO, SiC, BaTiO, Si, or SrTiO films or films whose main element is one of these substances as the above varistor material.

According to a still further aspect of the present invention, the object of the present invention is achieved by the above magnetoresistive head employing a material which exhibits varistor characteristics and is multilayer made up of $Al_2O_3$, $SiO_2$, $Ta_2O_5$, $Bi_2O_5$, MnO, NiO, CoO, Fe—O, $TiO_2$, $HfO_2$, $ZrO_2$, or $Nb_2O_5$ films or oxide films whose main element is one of these substances in combination with films selected from among ZnO, SiC, BaTiO, Si, and SrTiO films as the above varistor material.

According to yet another aspect of the present invention, the object of the present invention is achieved by a magnetoresistive head employing one or more multilayer wherein the thickness of a film made of $Al_2O_3$, $SiO_2$, $Ta_2O_5$, $Bi_2O_5$, MnO, NiO, CoO, Fe—O, $TiO_2$, $HfO_2$, $ZrO_2$, or $Nb_2O_5$ or an oxide film whose main element is one of these substances is 5 nm or less.

According to a still further aspect of the present invention, the object of the present invention is achieved by a magnetoresistive head employing a varistor material of multilayer made up of $Al_2O_3$, $SiO_2$, $Ta_2O_5$, $Bi_2O_5$, MnO, NiO, CoO, Fe—O, $TiO_2$, $HfO_2$, $ZrO_2$, or $Nb_2O_5$ films or oxide films whose main element is one of these substances in combination with films selected from among ZnO, SiC, BaTiO, Si, and SrTiO films as the material of a layer forming a bypass for preventing the breakdown of the magnetoresistive layer in at least a part thereof.

Even in the magnetic device comprising a multilayer which has two or more magnetic layers separated by one or more non-magnetic layers and performs magnetic sensing by taking advantage of current change depending on the relative magnetization directions of the magnetic layers, a pair of magnetic domain control layers provided on either sides of the multilayer to apply a longitudinally bias magnetic field in order to inhibit the Barkhausen noise, a pair of electrodes placed over and beneath the multilayer for allowing an electrically sensing current to flow across the laminate in the perpendicular direction, insulating gap layers for isolating the upper and lower electrodes, and upper and under layers placed so as to sandwich the multilayer therebetween, it has been found that a tunnel magnetoresistive head structure strong enough to prevent the breakdown is made by inserting or filling a material exhibiting varistor, transistor, or diode characteristics between the upper and the lower electrodes.

Furthermore, by making multilayer of a material exhibiting varistor characteristics, such as ZnO, SiC, Si, etc. in combination with an oxide material such as $SiO_2$, $Al_2O_3$, etc., a magnetoresistive head can be supplied which exhibits varistor characteristics even in the thin film form and is made more resistant to breakdown by adjusting the layer structure and electrode area.

The purpose of the present invention is also achieved by a magnet head assembly made by combining the above magnetoresistive head with an inductive thin film head.

The purpose of the present invention is also achieved by a magnetic read/write device with the above magnetic head assembly installed thereon.

BRIEF DESCRIPTION OF THE DRAWINGS

FIGS. 12A–12E show top plan views of a substrate on which a magnetic head of a preferred Embodiment 5 of the present invention has been constructed for explaining the process of producing the head and a vertical sectional view of the head.

DETAILED DESCRIPTION OF THE PREFERRED EMBODIMENTS

The present invention will now be explained more specifically. Preferred embodiments of the present invention will be described below with reference to the appended drawings and charts for the examples of actually produced heads of the present invention.

Embodiment 1

FIG. 3 shows illustration of a varistor structure using for a part of a magnetoresistive head produced as a preferred Embodiment 1 of the present invention.

Figures 3A, 3B:
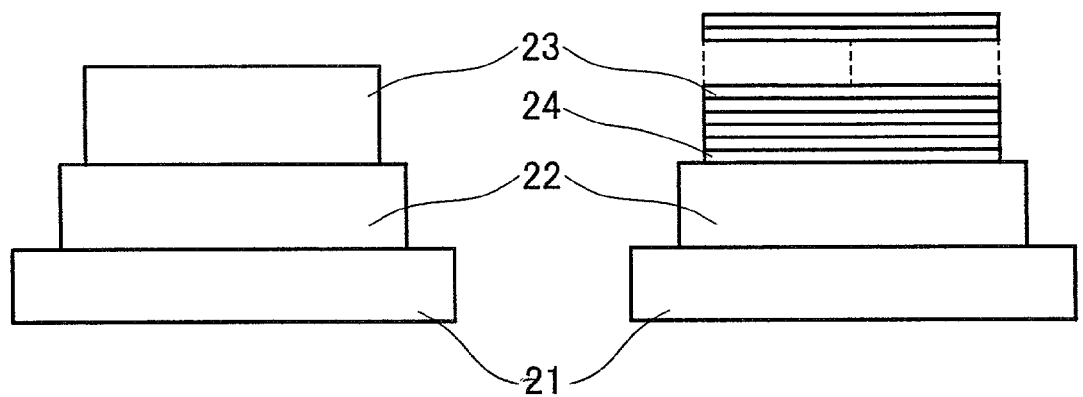
FIGS. 3A and 3B show illustration of a varistor structure of the present invention.

In the layer structures shown, on a lower electrode layer 22 seated on a substrate 21, a ZnO layer 23 or a ZnO/SiO2 multilayer 23/24 was made as the varistor layer (the ZnO/SiO2 multilayer 23/24 is shown in FIG. 3B).

Each layer was made by RF sputtering; by sputtering ZnO and SiO2 materials, one of which is targeted on the object at every sputtering, in the same chamber, thereby producing the ZnO/SiO2 multilayer and the ZnO single-component-layer.

Figure 4:
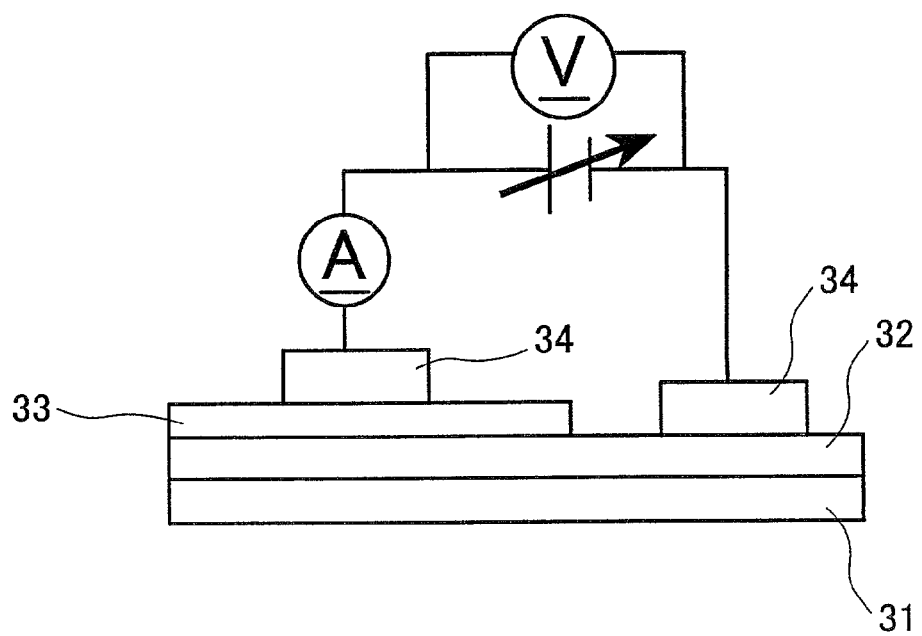
FIG. 4 is a diagram for explaining the method for measuring of dielectric strength.

The I (current) vs. V (voltage) characteristics of the produced magnetic gap layers were evaluated. is shown in FIG. 4, on the Si substrate 31, a lower As electrode layer 32 of NiFe (with a thickness of 1 µm), a ZnO layer or ZnO/SiO2 multilayer 33 to be evaluated, and an upper electrode layer 34 of Al (with a thickness of 1 µm×1 mm φ) were made sequentially. The evaluation was carried out by applying voltage between the lower and upper electrode layers and measuring the leak current.

Figure 1:
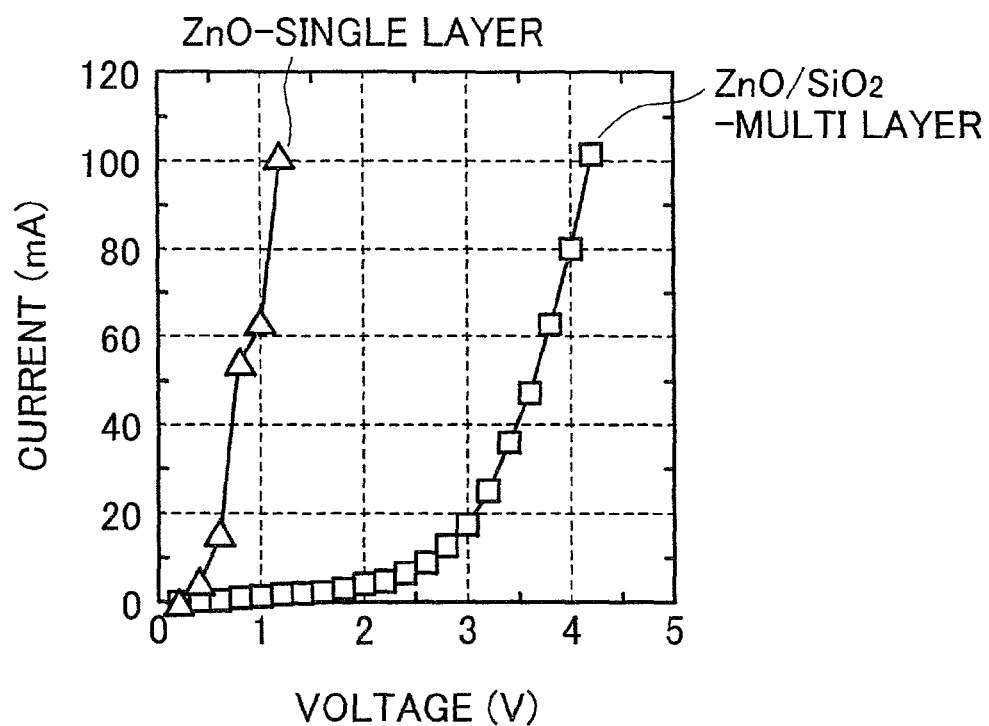
FIG. 1 is a graphic representation of illustrative I–V characteristics of a ZnO single layer and a $ZnO/SiO_2$ multilayer employed in a magnetoresistive head of the present invention.

The I–V characteristics of the above-mentioned layers are shown in FIG. 1. For the single-component layer consisting entirely of ZnO films (30 nm), the current value rapidly increases at very low voltage (varistor voltage). By contrast, for the multilayer of [ZnO (4 nm)/SiO2 (1 nm)] film×6 layers, the leak current value is low and the varistor voltage is high. From this result, it is appreciated that the multilayer exhibits excellent varistor characteristics.

Figure 5:
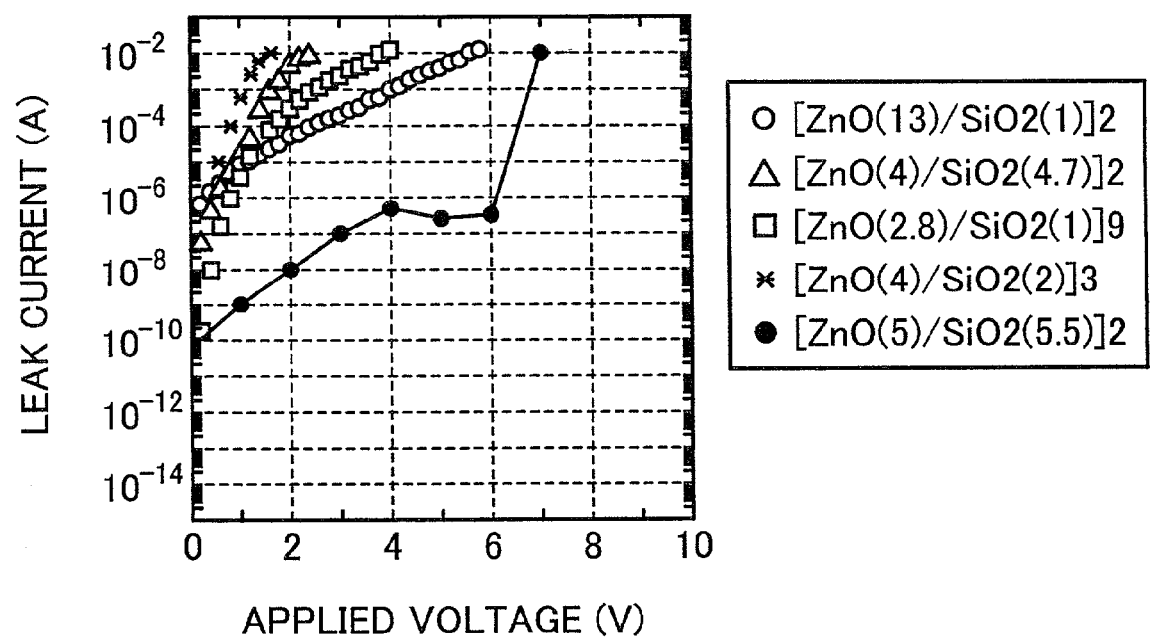
FIG. 5 is a graphic representation of illustrative I–V characteristics of ZnO/SiO2 multilayer employed in a magnetoresistive head of the present invention with each layer thickness varying.

Then, the thickness of each film layer of the multilayer was varied, and the variation of the I–V characteristics of the resulting layers is shown in FIG. 5. Here, for the multilayer in which the SiO2 film thickness is as thick as at least 5.5 nm (its characteristic curve is the one with bullets), it has insulating properties with a relatively low leak current, but the dielectric breakdown occurs by the applied voltage of 6V or higher and it is not recoverable. For the remaining multilayer in which the SiO2 film thickness is 4.7 nm or less, on the other hand, they all exhibit varistor characteristics and return to the original state after the voltage application. From this result, it is appreciated that a desirable thickness of the oxide film is 5 nm or less to obtain the varistor characteristics. For the multilayer in which the SiO2 film thickness is 1 nm and multiplied by nine layers, the leak current value is low at low voltage. This indicates that it is desirable to make the SiO2 film as thin as possible and increase the number of SiO2 layers to be laminated. The leak current can be further reduced by decreasing the electrode area.

Figure 6A:
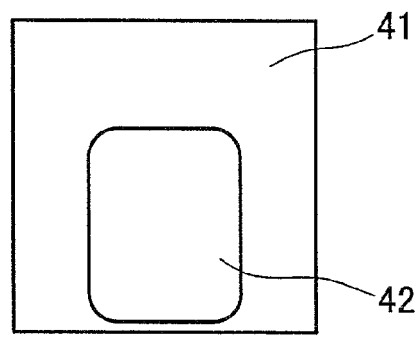
FIGS. 6A–6E show top plan views of a substrate on which a magnetic head of a preferred Embodiment 1 of the present invention has been constructed for explaining the process of producing the head.
Figure 6B:
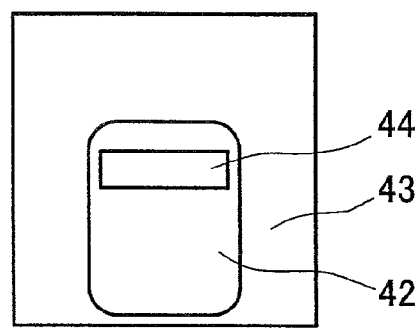
Figure 6C:
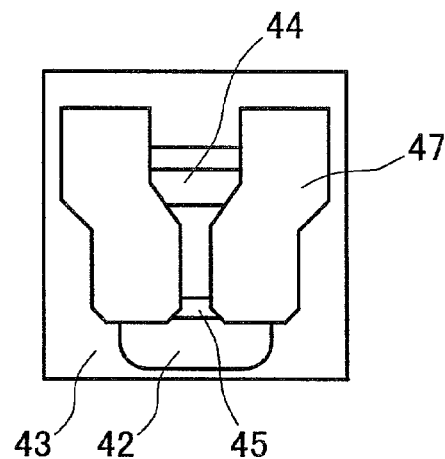

Then, a read head, namely, a magnetoresistive head of the present invention was produced by using the above-described multilayer, according to the producing method of the present invention. The overview of the process of producing the head is shown in FIG. 6, the top plan views of a substrate on which the head has been constructed. By referring to FIG. 6, the process will be explained below. First, on an nonmagnetic substrate 41 which is a deposited thin-film insulating layer made of an insulating material such as Al2O3 after being processed by precise grinding, a 2.0-µm thick Ni—Fe layer is pattern made as an under shield layer 42 (FIG. 6A). After depositing an Al2O3 film (20 nm) as an under gap layer 43, a window is formed with resist by means of photolithography and engraved by ion milling until the shield is exposed. After a multilayer 44 of [ZnO (4 nm)/SiO2 (1 nm)] film×6 layers is made, the resist is stripped off (FIG. 6B). Then, a multilayered spin-valve film is made as a magnetoresistive layer 45 consisting of deposited films [Ta (3 nm)/Ni—Fe (2 nm)/Co (0.5 nm)/Cu (2 nm)/Co (1 nm)/Ru (0.7 nm)/Co (2 nm)/Mn—Pt (12 nm)]. After patterning the magnetoresistive layer 45 into a predetermined shape by ion milling, magnetic domain control layers made of Co-pt for inhibiting the Barkhausen noise and electrodes 47 made of TaW/Ta are made (FIG. 6C). In this way, the electrodes 47 and the under layer 42 have been connected by the multilayer 44 of varistor material.

Figure 6D:
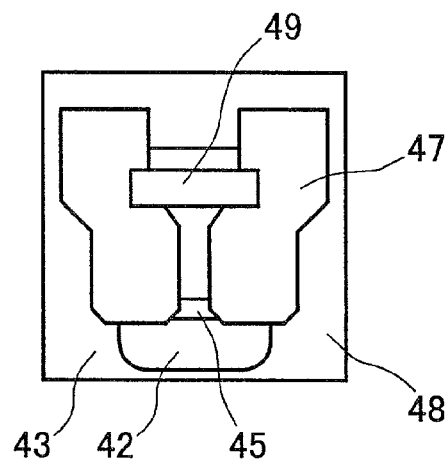
Figure 6E:
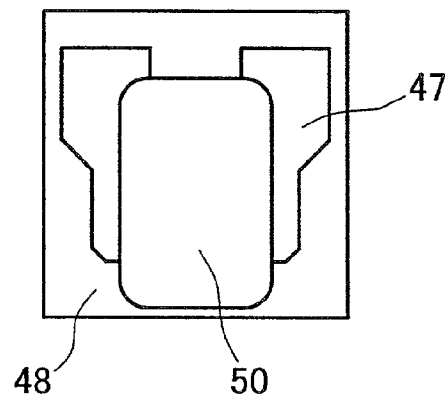

On top of that, next, an upper gap layer 48 of a 25-nm thick Al2O3 film is made, and then a window is formed with resist by means of photolithography and engraved by ion milling until the electrode is exposed. Then, a multilayer of varistor material 49 of [ZnO (4 nm)/SiO2 (1 nm)] film×6 layers is made and the resist is stripped off (FIG. 6D). On top of that, an upper shield layer 50 consisting of a 3.0-μm thick Ni—Fe film is pattern made (FIG. 6E). In this way, the electrodes 47 and the upper shield layer 50 have been connected via the multilayer of varistor material 49.

Figure 7:
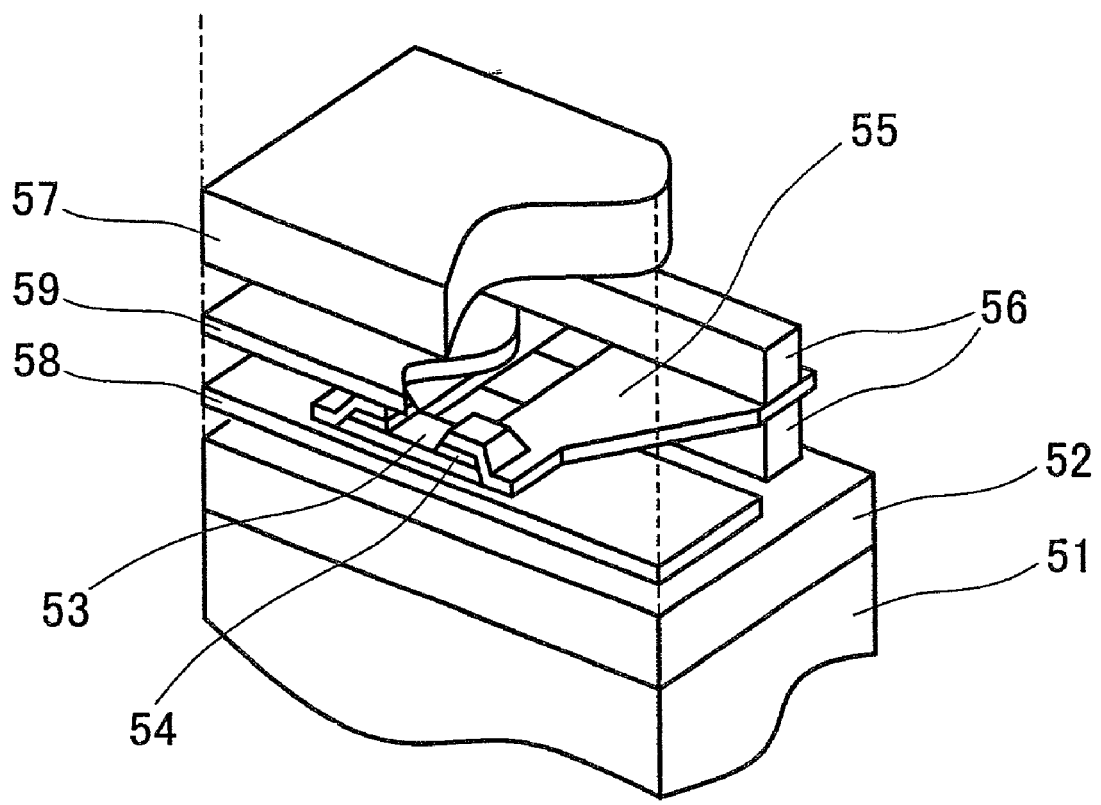
FIG. 7 is a perspective view of the magnetic head of Embodiment 1 of the invention.

The perspective view of the magnetic head of the present invention produced in the method described above is shown in FIG. 7. An under shield layer 52 is made on the substrate 51, and on the top of that layer, an under gap layer 58 and a magnetoresistive layer 53 are made. On either sides of the magnetoresistive layer, magnetic domain control layers 54 and electrodes 55 are made, and an upper gap layer 59 and upper shield layer 57 are deposited on the magnetoresistive layer 53 and electrodes 55. The electrodes 55 are connected to upper and under shield layer via varister films of ZnO/SiO2 multilayer 56 in the rear of the perspective. In the front of the layers of varistor material, an upper gap layer is placed over the electrodes, and on top of that, an upper shield layer is placed, also covering the top of the multilayer of varistor material. For the present head, when a high voltage is applied, current flows through the multilayer (ZnO/SiO2 films) of varistor material forming the current paths between the electrodes and the shields and the current path between both electrodes. Thus, the breakdown of the magnetoresistive element can be prevented. The table shown in FIG. 10 gives the yield rate for the magnetoresistive heads structured in accordance with the present invention and those structured, according to prior art when a voltage of 5V and 10V is applied between the electrodes and shields.

Figures 9, 10:
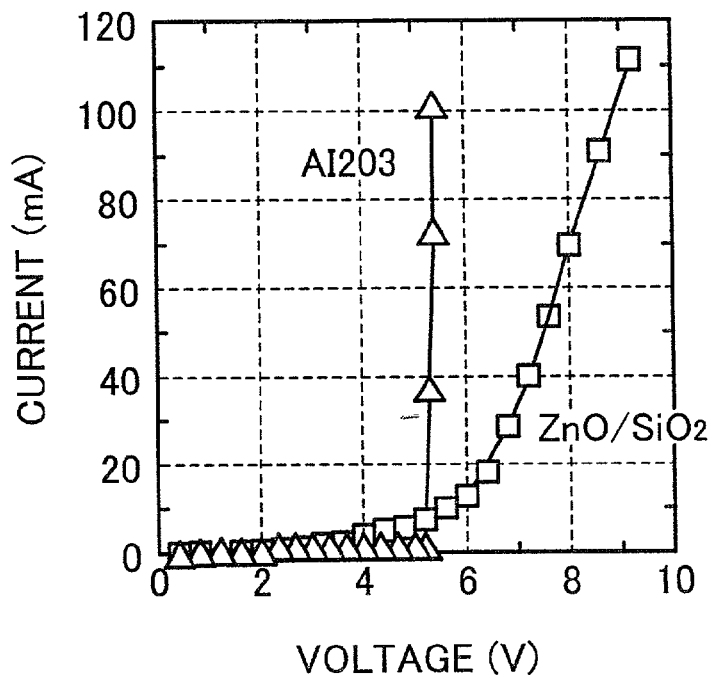
FIG. 9 is a graphic representation of illustrative I–V characteristics of a conventional magnetic head and a magnetic head of a preferred Embodiment 2 of the present invention.
FIG. 10 shows a table giving the yield rate for the magnetoresistive heads structured in accordance with the present invention and those structured, according to prior art.

As obvious from the table shown in FIG. 10, for the magnetoresistive head of the present invention employing the varistor material, a higher yield rate is maintained when a voltage equal to or higher than 5 V is applied. Thus, it will be appreciated that the magnetoresistive head having good insulating properties can be provided by the present invention.

Figure 8:
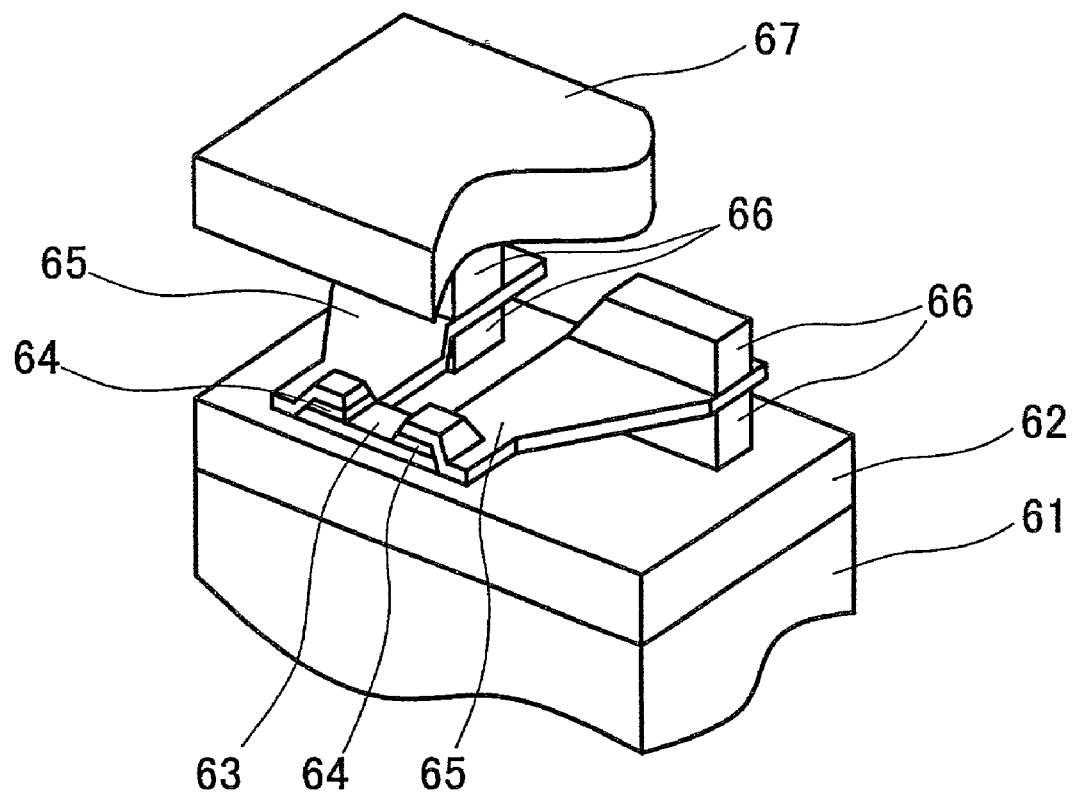
FIG. 8 is a perspective view of a magnetic head of alternative structure according to Embodiment 1 of the invention.

While the present embodiment adopts the head producing method that the gap layers are engraved and filled with varistor material, both the gap layers and varistor layers can also be produced by a lift-off method. Moreover, while the ZnO/SiO2 layers are made to connect both electrodes besides connecting the shields and the electrodes, the layers may be made to simply connect the shields and the electrodes as is shown in FIG. 8. Even in the latter constitution, the breakdown of the magnetoresistive element can be prevented. However, if a very high voltage is applied between both electrodes, the short circuit formed between the electrodes is preferable as in the former constitution shown in FIG. 7 so that breakdown will not occur.

While the ZnO/SiO2 multilayer is applied in the present embodiment described, other kinds of multilayer made up of diverse films can produce the same effect; e.g., varistor films such as SiC, BaTiO, Si, etc. instead of the ZnO films in combination with oxide films such as Al2O3, Ta2O5, Bi2O5, MnO, NiO, CoO, Fe—O, TiO2, HfO2, ZrO2, or Nb2O5 instead of the SiO2 films. Instead of the multilayer, single-component-layers consisting entirely of ZnO, SiC, BaTiO, or Si films or films whose main element is one of these substances may be used. However, it is preferable to use the multilayers because the varistor voltage and leak current can be controlled by selecting the multilayered structure.

Embodiment 2

Figure 2:
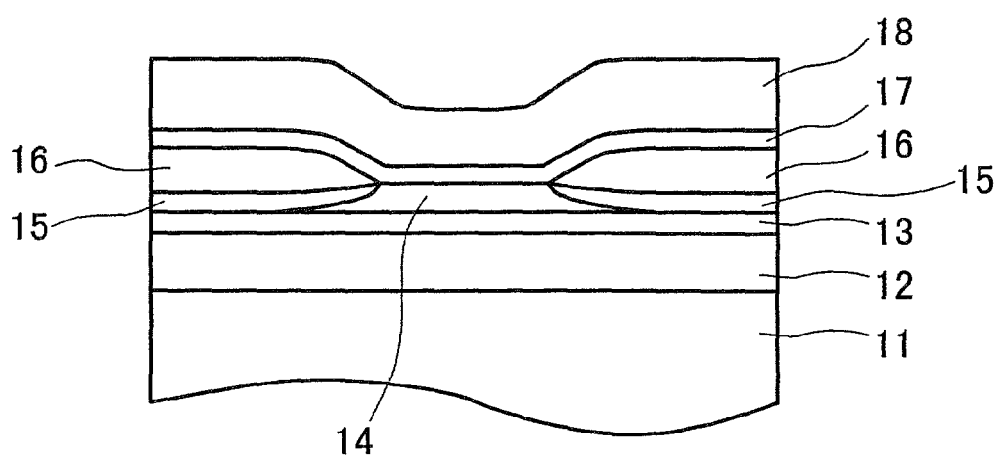
FIG. 2 is a vertical sectional view of a magnetoresistive head viewed from the air bearing surface.

As another constitution of the present invention, a read head, namely, a magnetoresistive head was produced, using the ZnO/SiO2 multilayer used in Embodiment 1 as the gap layers. FIG. 2 shows a vertical sectional view of the head viewed from the air bearing surface. With reference to FIG. 2, the head structure will be explained below. As is the case in Embodiment 1, on an non-magnetic substrate 11 which is a deposited thin-film insulating layer made of an insulating material such as Al2O3 after being processed by precise grinding, a 2.0-μm thick Ni—Fe film is made as an under shield layer 12. On top of that, a multi layer of [ZnO (3 nm)/SiO2 (1 nm)] film×4 layers was made as an under gap layer 13. Then, a multi-layered spin-valve film was made as a magnetoresistive layer 14 consisting of deposited films [Ta (3 nm)/Ni—Fe (2 nm)/Co (0.5 nm)/Cu (2 nm)/Co (1 nm)/Ru (0.7 nm)/Co (2 nm)/Mn—Pt (12 nm)].

After patterning the magnetoresistive layer 14 into a predetermined shape by ion milling, magnetic domain control layers 15 made of Co-pt for inhibiting the Barkhausen noise and electrodes 16 made of TaW/Ta were made. On top of that, a multi-layer of [ZnO (3 nm)/SiO2 (1 nm)] film×6 layers as an upper gap layer 17 was made and an upper shield layer 18 consisting of a 3.0-μm thick Ni—Fe film was made.

For comparison purposes, another magnetic head employing the Al2O3 films as the under gap layer 13 and the upper gap layer 17 with the same thickness was also produced. For this head and the head of Embodiment 2, voltage was applied between the shields and the magnetoresistive element. FIG. 9 shows a graphic representation of current value change as the voltage increases. For the head using the Al2O3 films, the dielectric breakdown by the application of a voltage of 5V and it is not recoverable. By contrast, for the head using the ZnO/SiO2 multi-layer, even when 10 V is applied, the leak current value becomes high, but the breakdown does not occur unless the voltage application continues for a long period. Deterioration is not detected by re-evaluation of the characteristics of the read-back head.

While the ZnO/SiO2 multi-layers is applied in the present embodiment described, other kinds of multi layers made up of diverse films can produce the same effect; e.g., varistor films such as SiC, BaTiO, Si, etc. instead of the ZnO film in combination with oxide films such as Al2O3, Ta2O5, Bi2O5, MnO, NiO, CoO, Fe—O, TiO2, HfO2, ZrO2, or Nb2O5 instead of the SiO2 films. Instead of the multi-layers, single-component-layers consisting entirely of ZnO, SiC, BaTiO, or Si films or films whose main element is one of these substances may be used. However, it is preferable to use the multi layer because the varistor voltage and leak current can be controlled by selecting the multilayered structure.

Embodiment 3

Figure 17:
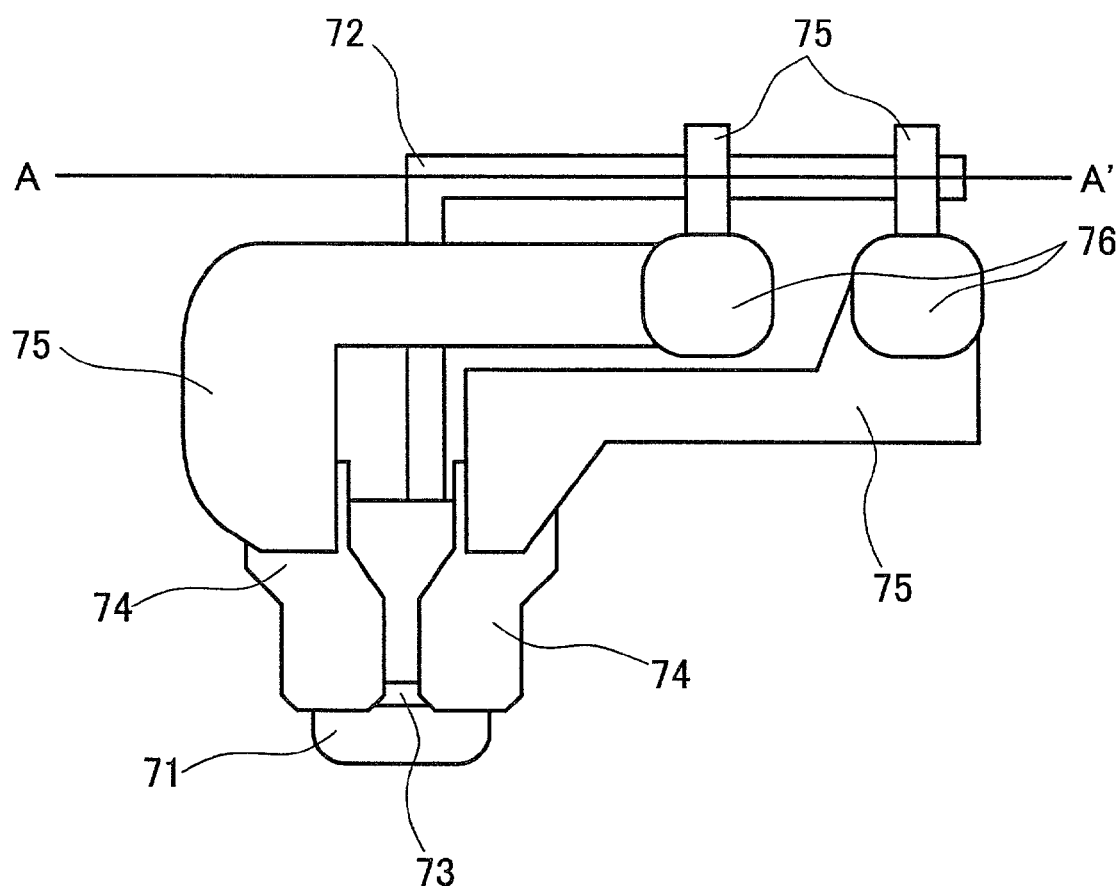
FIG. 17 is a plan view of a substrate on which a magnetic head of a preferred Embodiment 3 of the present invention has been constructed.
Figure 18:
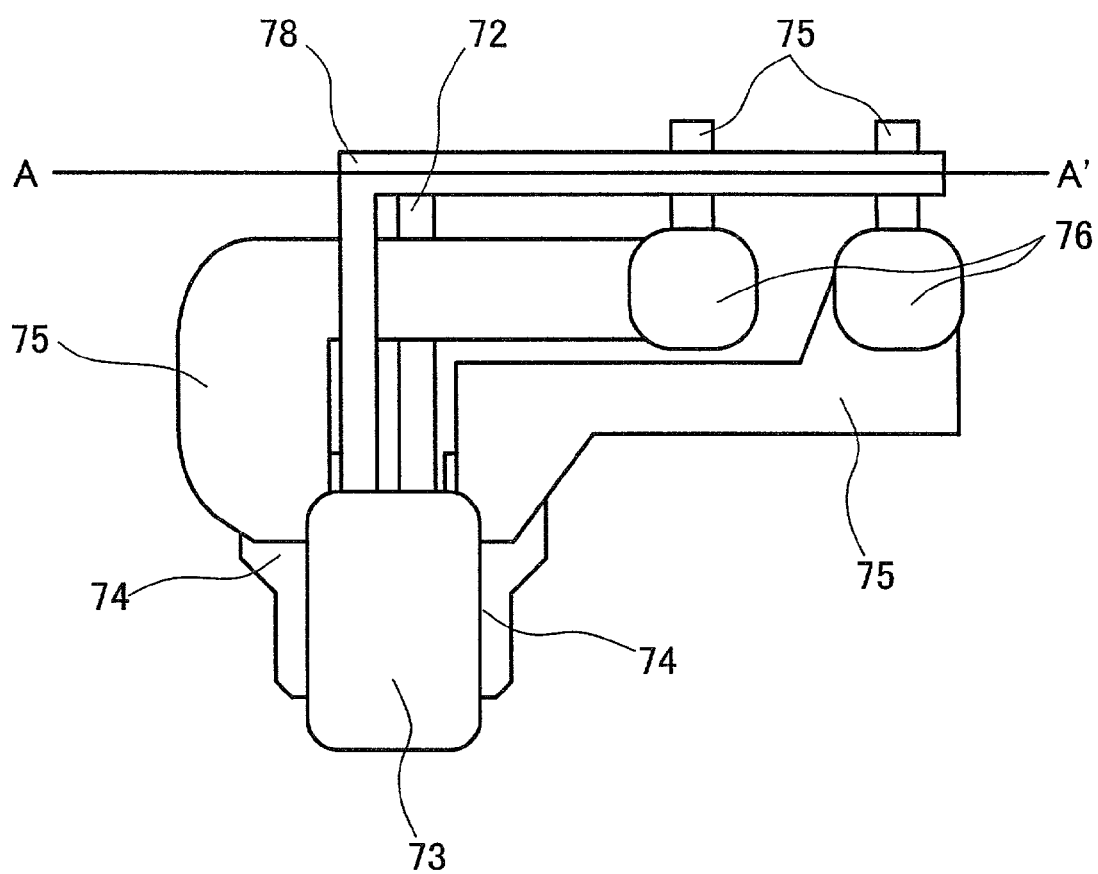
FIG. 18 is another plan view of the substrate on which the magnetic head of Embodiment 3 has been constructed.
Figure 19:
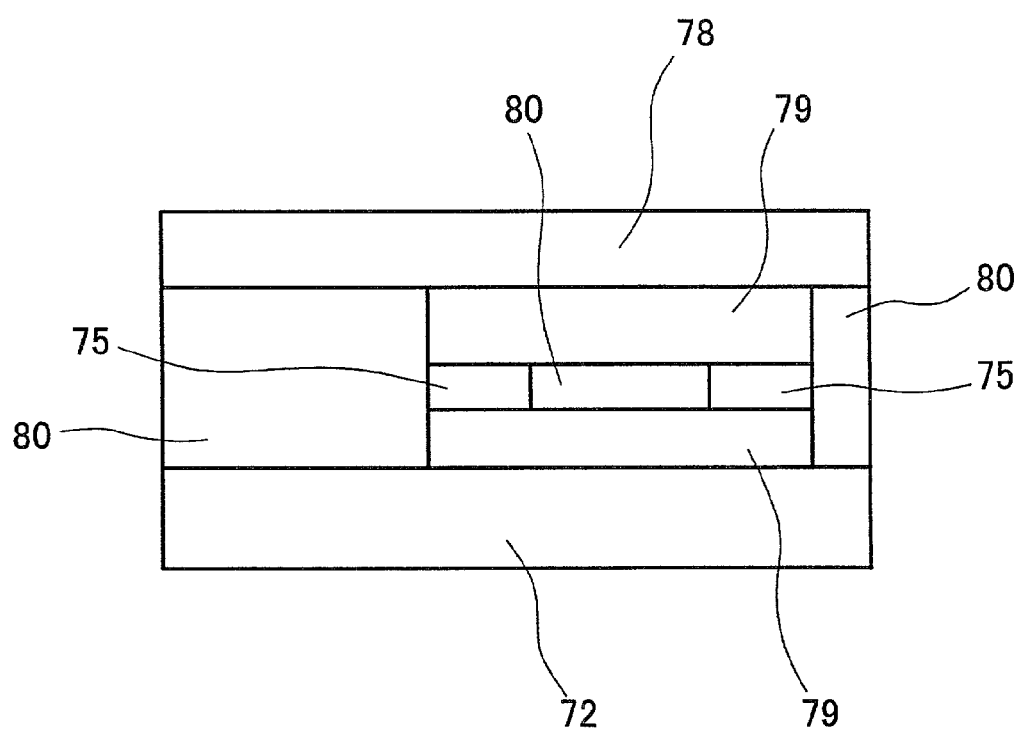
FIG. 19 is a sectional view of the magnetic head of Embodiment 3 of the invention.

As yet another constitution of the present invention, a read head, namely, a magnetoresistive head was produced, using the multi-layers set forth in Embodiment 1. FIGS. 17, 18, and 19 are top plan views of a substrate on which the head has been constructed and a sectional view of the head. FIG. 17 depicts the head at a production stage that the magnetoresistive element and its under layers have been made. FIG. 18 depicts the complete head with the upper shield layer made finally. FIG. 19 is the sectional view of plane A–A' shown in FIG. 8.

As shown in FIGS. 17 and 19, a lead being at the same potential as the potential of the under shield layer 71, namely, an under shield's lead electrode 72 and lead electrodes 75 being at the same potential as the electrodes 74, extended out of the lead terminals 76 of branches from the electrodes 74 connected to the magnetoresistive element, are connected by one ZnO/Bi2O5 multi-layer 79.

Similarly, as shown in FIGS. 18 and 19, a lead being at the same potential as the potential of the upper shield layer 77, namely, an upper shield's lead electrode 78 and lead electrodes 75 being at the same potential as the potential of the electrodes 74, extended out of the lead terminals 76 of branches from the electrodes 74 connected to the magnetoresistive element, are connected by the other ZnO/Bi2O5 multi layer 79. Since the current paths have been made in this way, in case a high voltage is applied between the magnetoresistive element and the shields, overcurrent flows through the multi-layer of varistor material to the shield layers so that breakdown of the magnetoresistive element can be prevented. Heat generated by the overcurrent has little influence on the element because the paths are formed far from the element.

While the ZnO/Bi2O5 multi-layers is applied in the present embodiment described, other kinds of multi layers made up of diverse films can produce the same effect; e.g., material such as SiC, BaTiO, Si, etc. instead of ZnO in combination with oxide films such as Al2O3, Ta2O5, SiO2, MnO, NiO, CoO, Fe—O, TiO2, HfO2, ZrO2, or Nb2O5 instead of the Bi2O5 films. Single component-layer consisting entirely of ZnO, SiC, BaTiO, or Si films or films whose main element is one of these substances may be used. However, it is preferable to use the multi-layers because the varistor voltage and leak current can be controlled by selecting the multilayered structure.

Embodiment 4

Figure 11:
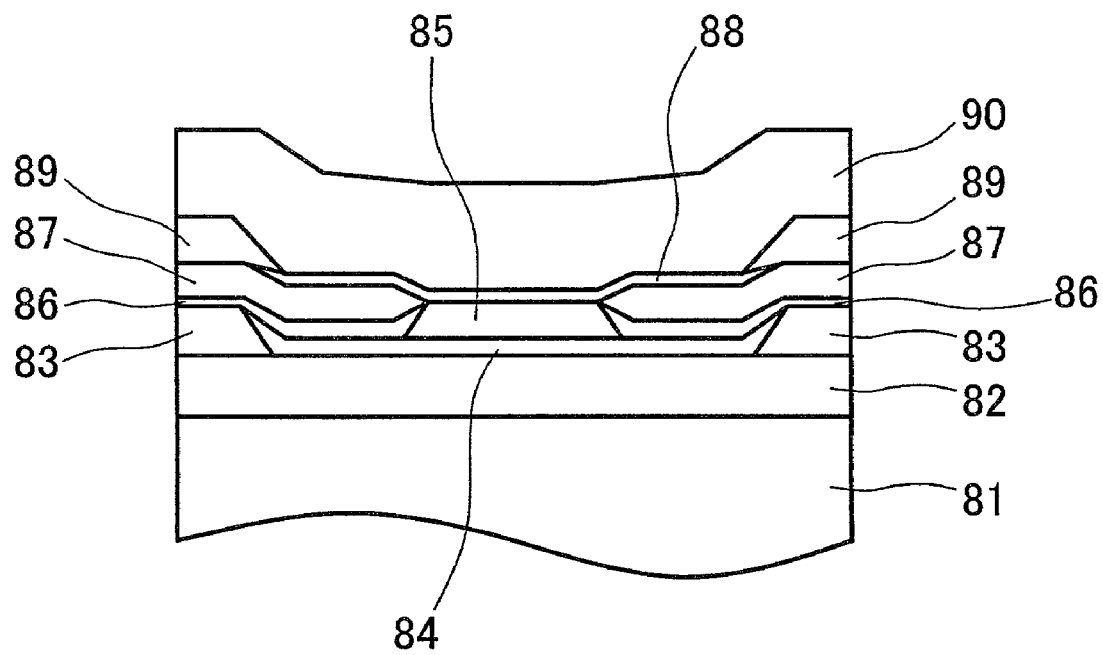
FIG. 11 is a vertical sectional view of a magnetoresistive head of a preferred Embodiment 4 of the present invention, viewed from the air bearing surface.

As a further constitution of the present invention, a read head, namely, a magnetoresistive head was produced, using the multi-layers set forth in Embodiment 1. FIG. 11 shows the vertical sectional view of the head viewed from the face to come in contact with a medium. With reference to FIG. 11, the head structure will be explained below. As is the case in Embodiment 1, on an non-magnetic substrate 81 which is a deposited thin-film insulating layer made of an insulating material such as Al2O3 after being processed by precise grinding, a 2.0-μm thick Ni—Fe film is made as an under shield layer 82. After making a multi layer 83 of [ZnO (4 nm)/SiO2 (1 nm)] film×5 layers, it is engraved by milling to provide space where the magnetoresistive element is to be positioned until the shield is exposed and an Al2O3 film of 15 nm is pattern made by the lift-off method as an under gap layer 84. Then, a multi-layered spin-valve film was made as a magnetoresistive layer 85 consisting of deposited films [Ta (3 nm)/Ni—Fe (2 nm)/Co (0.5 nm)/Cu (2 nm)/Co (1 nm)/Ru (0.7 nm)/Co (2 nm)/Mn—Pt (12 nm)].

Then, the magnetoresistive layer 85 was patterned into a predetermined shape by ion milling and magnetic domain control layers 86 made of Co-pt for inhibiting the Barkhausen noise and electrodes 87 made of TaW/Ta were made. On top of that, an Al2O3 film of 25 nm is made by the lift-off method as an upper gap layer 88 and then multi-layers 89 of [ZnO (4' nm)/SiO2 (1 nm)] film×5 layers is made to cover both outer ends of the upper gap. Finally, an upper shield layer 90 consisting of a 3.0-μm thick Ni—Fe film was made.

By making the magnetic head in the present constitution, the leak current is made so small as to be negligible due to high resistance of the ZnO/SiO2 multi-layers during normal read/write performance. In case a high voltage is applied, an excessive leak current flows through the ZnO/SiO2 film to the shield layers so that insulation breakdown of the magnetoresistive element can be prevented.

While the ZnO/SiO2 multi-layers is applied in the present embodiment described, other kinds of multi layers made up of diverse films can produce the same effect; e.g., material such as SiC, BaTiO, Si, etc. instead of ZnO in combination with film such as Al2O3, Ta2O5, Bi2O5, MnO, NiO, CoO, Fe—O, TiO2, HfO2, ZrO2, or Nb2O5 instead of the SiO2 film. Layers consisting entirely of ZnO, SiC, BaTiO, or Si films or films whose main element is one of these substances may be used. However, it is preferable to use the multi-layer because the varistor voltage and leak current can be controlled by selecting the multilayered structure.

Embodiment 5

As yet another constitution of the present invention, a read head, namely, a magnetoresistive head was produced, using the multi-layer set forth in Embodiment 1. FIG. 12 shows the top plan views of a substrate on which the head has been constructed. With reference to FIG. 12, the head structure will be explained below. As is the case in Embodiment 1, on an 5non-magnetic substrate 91 which is a deposited thin-film insulating layer made of an insulating material such as Al2O3 after being processed by precise grinding, an under shield layer 92 of a 2.0 thick Ni—Fe film, an under gap layer 93 of a 15-nm thick Al2O3 film, and a multi-layered spin-valve film 94 as a magnetoresistive layer were made sequentially. The spin-valve film consists of deposited films [Ta (3 nm)/Ni—Fe (2 nm)/Co (0.5 nm)/Cu (2 nm)/Co (1 nm)/Ru (0.7 nm)/Co (2 nm)/Mn—Pt (12 nm)].

Then, the magnetoresistive layer 94 is patterned by ion milling and magnetic domain control layers made of Co-pt for inhibiting the Barkhausen noise and electrodes 96 made of TaW/Ta are made (FIG. 12A). To fix the height of the magnetoresistive element, resist 97 patterning is performed. Using the resist 97 as the mask, ion milling is performed until the under shield 92 is exposed and then a multi-layer 98 of [ZnO (4 nm)/SiO2 (1 nm)] film×5 layers is made as the protective film (FIG. 12B).

After stripping off the resist (FIG. 12C), on top of that, a 25-nm thick Al2O3 film pattern is made by the lift-off method as an upper gap layer 99 (FIG. 12D). Finally, an upper shield layer 100 consisting of a 3.0-μm thick Ni—Fe film was made. The section view of plane B—B' of the magnetic head produced in the method described above is shown in FIG. 12E.

As shown in this figure, the multi-layer functions as a varistor by which the magnetoresistive layer 94 is electrically connected to the upper shield 100 and the under shield 92. By making the magnetic head in the present constitution, dielectric breakdown of the magnetoresistive element can be prevented because the leak current flows through the multi-layer as the varistor even when a high voltage is applied between both electrodes or the magnetoresistive element and the shields.

While the ZnO/SiO2 multi-layer is applied in the present embodiment described, other kinds of multi layers made up of diverse films can produce the same effect; e.g., material such as SiC, BaTiO, Si, etc. instead of ZnO in combination with films such as Al2O3, Ta2O5, Bi2O5, MnO, NiO, CoO, Fe—O, TiO2, HfO2, ZrO2, or Nb2O5 instead of the SiO2 films. Single-component-layers consisting entirely of ZnO, SiC, BaTiO, or Si films or films whose main element is one of these substances may be used. However, it is preferable to use the multi-layer because the varistor voltage and leak current can be controlled by selecting the multilayered structure.

Embodiment 6

Figure 13:
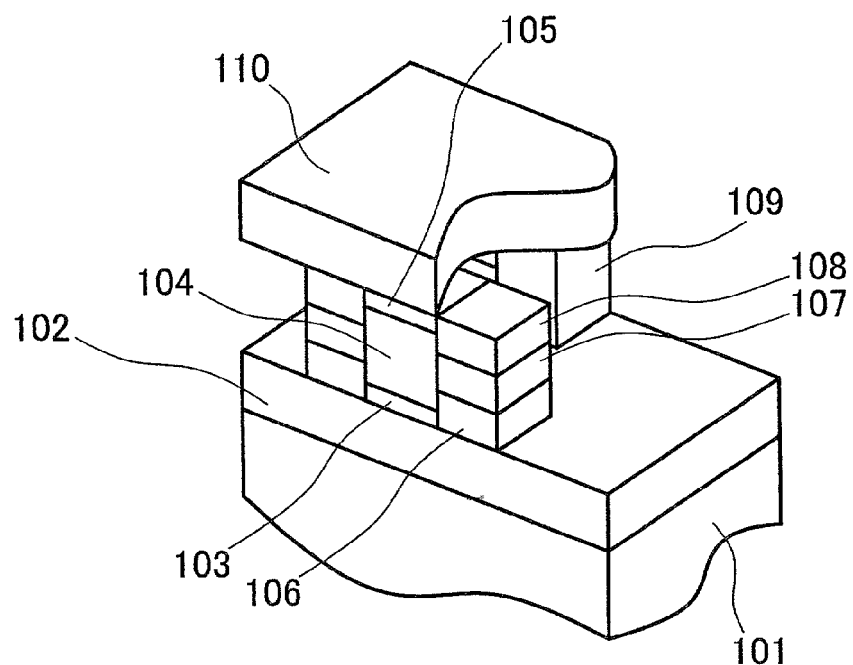
FIG. 13 is a perspective view of a magnetoresistive head of a preferred Embodiment 6 of the present invention.

As a still further constitution of the present invention, a read-back head, namely, a tunnel magnetoresistive head was produced, using the multi layers set forth in Embodiment 1. With reference to FIG. 13, the head structure will be explained below. As is the case in Embodiment 1, on an non-magnetic substrate 101 which is a deposited thin-film insulating layer made of an insulating material such as Al2O3 after being processed by precise grinding, a 2.0-μm thick Ni—Fe film is made as an under shield layer 102. Then, a lower electrode 103, a tunnel spin-valve film 104 as the magnetoresistive layer, and an upper electrode 105 were made in series and patterned into a predetermined shape. Hereon, the electrodes are made of Ru and the tunnel spin-valve film consists of deposited films [Ta (3 nm)/Ni—Fe (2 nm)/Co (0.5 nm)/Al 0 (1 nm)/Co (2 nm)/Mn—Pt (12 nm)]. On either sides of the tunnel spin-valve film, magnetic domain control layers 107 made of Co-pt for inhibiting the Barkhausen noise were made so as to be sandwiched between an under insulating layer 106 made of Al2O3 and an upper insulating layer 108 made of Al2O3. Then, part of the magnetoresistive element is engraved by ion milling until the lower electrode is exposed and the thus produced hole is filled with a multi-layer 109 of [ZnO (4 nm)/SiO2 (1 nm)] film×5 layers. Then, an upper shield layer 110 consisting of a 3.0-μm thick Ni—Fe film was made. In this way, a bypass was formed to allow current to flow through it when an excessive voltage is applied between the upper and lower electrodes.

While the multi-layer that functions as a varistor is applied in the present embodiment described, the application of a single-component-layers consisting entirely of ZnO, SiC, Si, BaTiO, or SrTiO films or films whose main element is one of these substances, which functions as a varistor, transistor, or diode, can produce the intended effect because the voltage at which breakdown occurs is relatively low in the case of the tunnel magnetic head. Furthermore, while the ZnO/SiO2 multi-layer is applied in the present embodiment described, other kinds of multi-layers made up of diverse films can produce the same effect; e.g., material such as SiC, BaTiO, Si, etc. instead of ZnO in combination with oxide films such as Al2O3, Ta2O5, Bi2O5, MnO, NiO, CoO, Fe—O, TiO2, HfO2, ZrO2, or Nb2O5 instead of the SiO2 films.

While the tunnel spin-valve films used in the present embodiment, a commonly applied spin-valve film structure may be used or a semiconductor material may be used as the material of a non-magnetic layer of the spin valve film. Alternatively, a film obtained by laminating magnetic layers and non-magnetic layers by multiple times can produce the same effect.

Even in a magnetic device comprising a multilayer which has two or more magnetic layers separated by one or more non-magnetic layers and performs magnetic sensing by taking advantage of current change depending on the relative magnetization directions of the magnetic layers, a pair of magnetic domain control layers provided on either sides of the multi-layer to apply a longitudinally bias magnetic field in order to inhibit the Barkhausen noise, a pair of electrodes placed over and beneath the multi-layer for allowing an electrically sensing current to flow across the film in the perpendicular direction, insulating gap layers for isolating the upper and lower electrodes, and upper and under shields placed so as to sandwich the multi-layer therebetween, a magnetic head that excellently withstands breakdown can be supplied by applying the film that functions as a varistor, transistor, or diode between the upper and lower electrodes.

Embodiment 7

Figure 14:
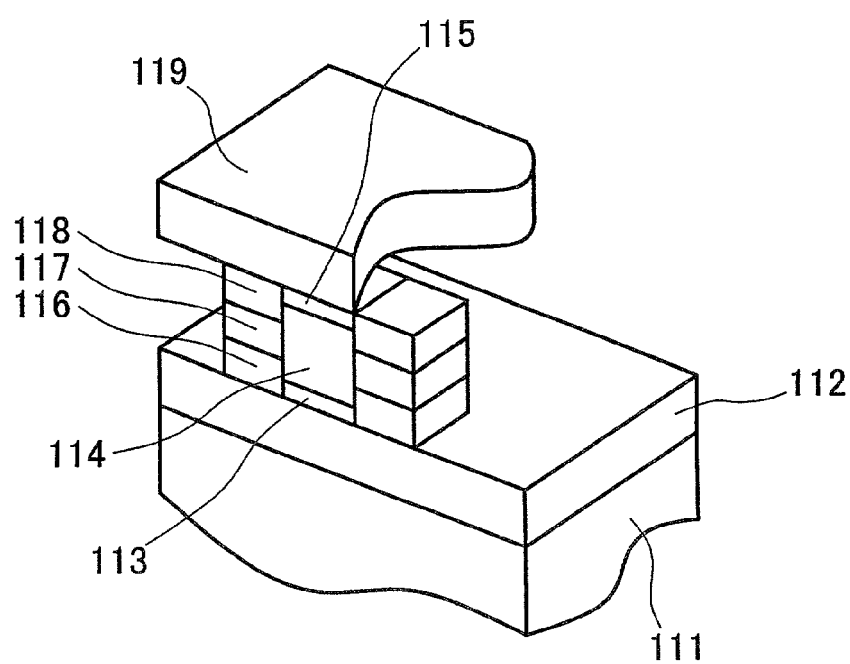
FIG. 14 is a perspective view of a magnetoresistive head of a preferred Embodiment 5 of the present invention.

As yet another constitution of the present invention, a read-back head, namely, a tunnel magnetoresistive head, which is a somewhat different structure from the head set forth in Embodiment 6, was produced. With reference to FIG. 14, the head structure will be explained below.

First, on an non-magnetic substrate 111 which is a deposited thin-film insulating layer made of an insulating material such as Al2O3 after being processed by precise grinding, a 2.0-μm thick Ni—Fe film is made as an under shield layer 112. Then, a lower electrode 113, a tunnel spin-valve film 114 as the magnetoresistive layer, and an upper electrode 115 were made in series and patterned into a predetermined shape. Hereon, the electrodes are made of Ru and the tunnel spin-valve film consists of deposited films [Ta (3 nm)/Ni—Fe (2 nm)/Co (0.5 nm)/Al—O (1 nm)/Co (2 nm)/Mn pt (12 nm)]. After patterning the tunnel spin-valve film, on its either sides, a single layer of varistor 116, magnetic domain control layers 117 made of Co-pt for inhibiting the Barkhausen noise, and a layer of varistor 118 were made in series. Hereon, the single layer varistors 116 and 118 are made of ZnO (30 nm) films. Then, an upper layer 119 consisting of a 3.0-μm thick Ni—Fe film was made. In this way, the varistor layers were formed to connect the upper and lower electrodes with the magnetic domain control layers 117 intervening between the upper and lower varistor layers, or in other words, the bypasses were formed to allow overcurrent to flow through them when an excessive voltage is applied.

While the ZnO (30 nm) films are applied in the present embodiment described, the application of other single-component-layer consisting entirely of SiC, Si, BaTiO, or SrTiO films or films whose main element is one of these substances, which function as varistors, transistors, or diodes, can produce the intended effect. Furthermore, the application of multi-layer made up of varistor material such as ZnO, SiC, Ba_iO, Si, etc. in combination with oxide films of SiO2, Al2O3, Ta2O5, Bi2O5, MnO, NiO, CoO, Fe—O, TiO2, HfO2, ZrO2, or Nb2O5 can produce the same effect.

While the tunnel spin-valve film is used in the present embodiment, a commonly applied spin-valve film structure may be used or a semiconductor material may be used as the material of a non-magnetic layer of the spin valve film. Alternatively, a film obtained by laminating magnetic layers and non-magnetic layers by multiple times can produce the same effect.

Embodiment 8

Figure 15:
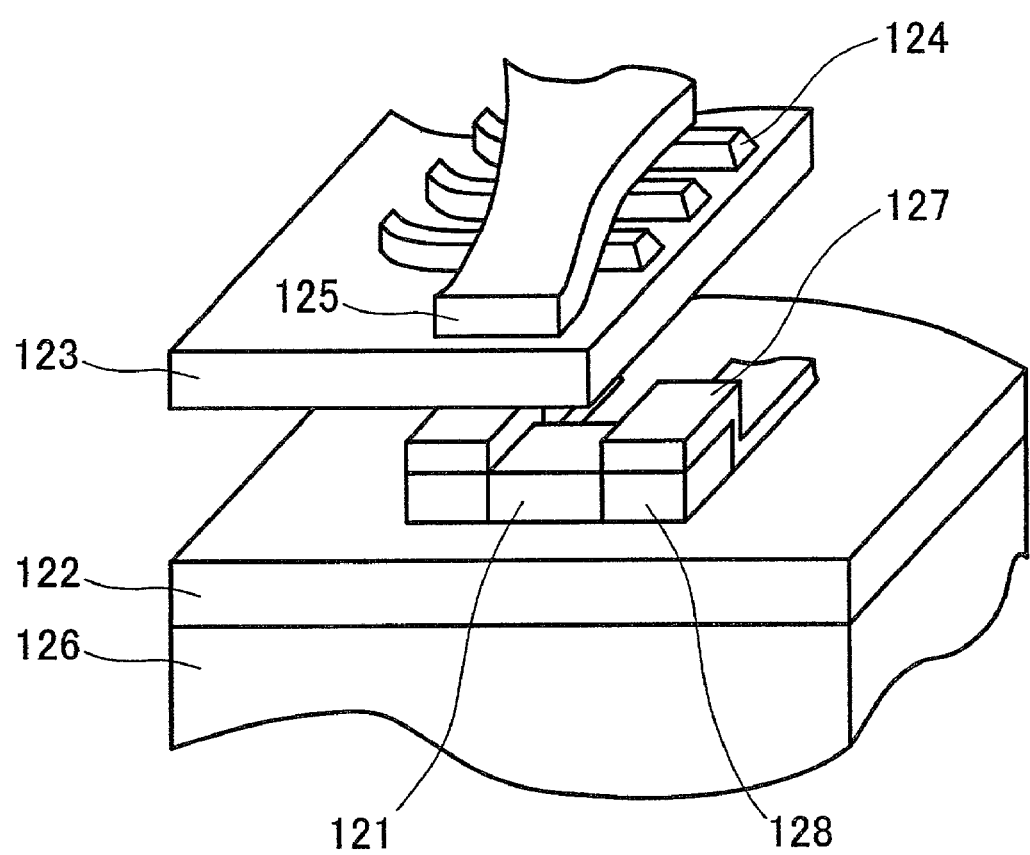
FIG. 15 is a perspective view of a magnetic head assembly of the present invention.

A magnetic head assembly was produced wherein the magnetoresistive head produced in accordance with Embodiment 1 was combined with a recording head. FIG. 15 is a perspective depicting a vertical section of the assembly of separate read/write heads. This head was formed on substrate 126 and the read head structure is the same as set forth in Embodiment 1. A multilayered spin valve film 121, magnetic domain control layer 128, and electrode 127 were formed on under gap layer/under shield layer 122. An upper gap layer/upper shield layer 121 also was formed on the layer. The read head structure is the same as set forth in Embodiment 1. A lower magnetic pole 123 of the recording head is the upper shield of the read head; that is, the shield also serves as the lower electrode. Coils 124 and an upper magnetic pole 125 of the write head are made of Cu and 46 wt % Ni—Fe films produced by electroplating, respectively. Magnetic gap layers and a protective film layer of the recording head are made of Al2O3 films. The track width of the write head is 0.4 µm and that of the read head is 0.3 µm.

In comparison with conventional magnetic heads, the magnetic head of the present invention is constructed such that dielectric breakdown hardly occurs. Thus, the method of producing the magnetoresistive head of the present invention enables manufacturers to produce magnetic heads at a higher yield rate of production. The application of any of the read heads set forth in Embodiments 2 to 7 can produce the same effect.

Embodiment 9

Figure 16A:
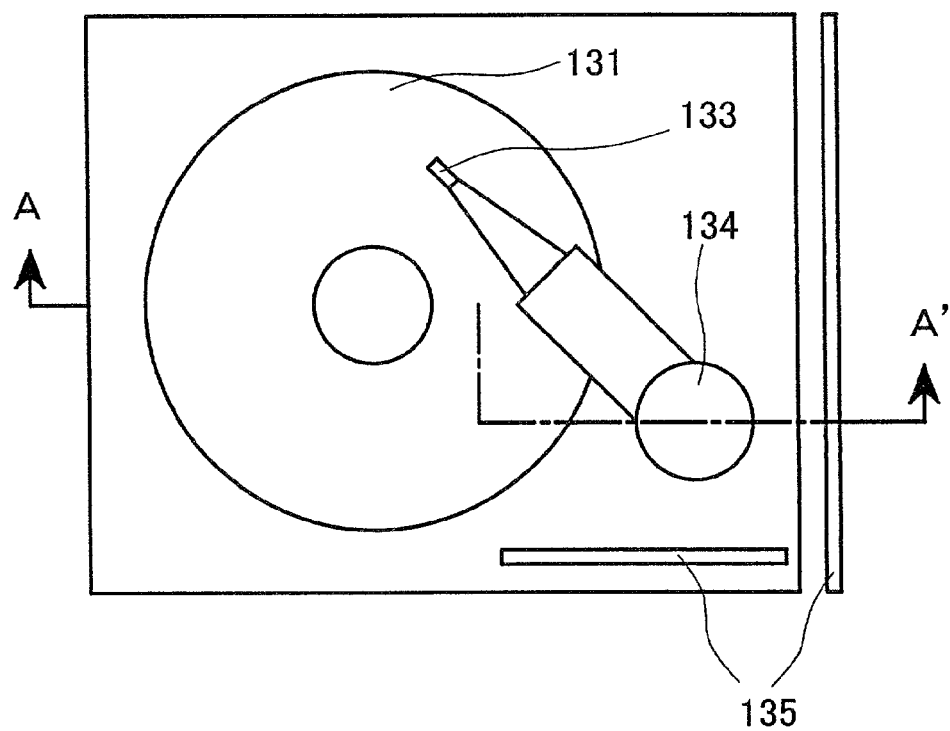
FIGS. 16A and 16B show plan and sectional views of a magnetic read/write device of the present invention.
Figure 16B:
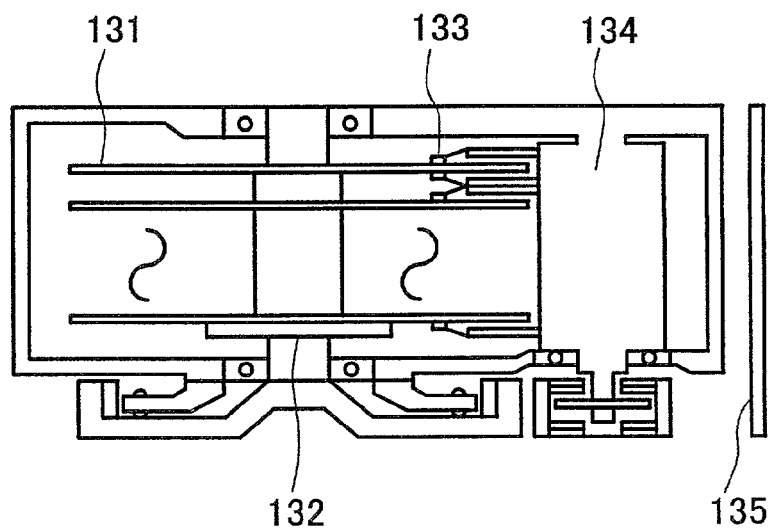

A magnetic disk drive was produced, using the assembly of separate read/write heads of the present invention. The outline structure of the magnetic disk drive is shown in FIG. 16. A magnetic recording medium 131 that is set on the drive is assumed made of material consisting of Co—Cr—Pt alloy with a residual magnetic flux density of 3400 Oe. As the read head of the magnetic head assembly 133, the read heads set forth in Embodiment 1 is used. In comparison with conventional magnetic heads not using varistor material, magnetic heads of the present invention can be produced at a higher yield rate of production. The application of any of the read-back heads set forth in Embodiments 2 to 7 can produce the same effect. In this way, magnetic disk drives with a high recording density can be produced. The magnetic heads of the present invention are effective for magnetic read/write devices with a recording density of 20 Gbit/in2 or more and would be necessary for such devices with a recording density of 40 Gbit/in2 or more.

As described above, according to the present invention, magnetic heads are made with advantages that breakdown can be prevented and they can be produced and supplied at higher yield rate of production.

Furthermore, the magnetic heads of the present invention employ multi-layers made up of varistor films of varistor material such as SnO, SiC, SrTiO, Si, etc. in combination of oxide insulating films of material such as SiO2, Al2O3, etc. By controlling the varistor voltage and leak current by using these films, even higher performance of the head can be obtained. Furthermore, by combining the above magnetoresistive head with an inductive thin film head, a read/write magnetic head assembly that performs well can be produced. Furthermore, a magnetic read/write device with the magnetic head assembly installed thereon has excellent characteristics of high magnetic read/write density.

What is claimed is:

1. A magnetoresistive head comprising a magnetoresistive layer which converts magnetic signals to electric signals, a pair of electrodes for allowing an electrically sensing current to flow across said magnetoresistive layer, upper and under gap layers placed over and beneath said pair of electrodes and said magnetoresistive layer, and upper and under shield layers, one of which is placed over said upper gap layer and the other is placed beneath said under gap layer, wherein at least either of said upper and under gap layers is made of varistor material so that electrostatic breakdown of the magnetoresistive layer is prevented.

2. The magnetoresistive head according to claim 1, wherein said magnetoresistive head employs a material consisting of ZnO, SiC, BaTiO, Si, or SrTiO films or films whose main element is one of these substances as said varistor material.

3. The magnetoresistive head according to claim 2, wherein said magnetoresistive head employs a material which exhibits varistor characteristics and is a multi layered structure made up of Al2O3, SiO2, Ta2O5, Bi2O5, MnO, NiO, CoO, Fe—O, TiO2, HfO2, ZrO2, or Nb2O5 films or oxide films whose main element is one of these substances in combination with films selected from among ZnO, SiC, BaTiO, Si, and SrTiO films as the above varistor material.

4. A magnetoresistive head,
comprising a magnetoresistive layer which converts magnetic signals to electric signals, a pair of electrodes for allowing an electrically sensing current to flow across said magnetoresistive layer, upper and under gap layers placed over and beneath said pair of electrodes and said magnetoresistive layer, and upper and under shield layers, one of which is placed over said upper gap layer and the other is placed beneath said under gap layer, wherein said pair of electrodes and at least either of said upper and under shield layers are electrically connected by varistor material that also interconnects said pair of electrodes;
wherein said magnetoresistive head employs a material which exhibits varistor characteristics and is multi layered structure made up of Al2O3, SiO2, Ta2O5, Bi2O5, MnO, NiO, CoO, Fe—O, TiO2, HfO2, ZrO2, or Nb2O5 films or oxide films whose main element is one of these substances in combination with films selected from among ZnO, SiC, BaTiO, Si, and SrTiO films as the above varistor material; and
wherein said material is formed in a multi-layer wherein the thickness of a film made of Al2O3, SiO2, Ta2O5, Bi2O5, MnO, NiO, CoO, Fe—O, TiO2, HfO2, ZrO2, or Nb2O5 or an oxide film whose main element is one of these substances is 5 nm or less.

5. A magnetoresistive head comprising a magnetoresistive layer which converts magnetic signals to electric signals, a pair of electrodes for allowing an electrically sensing current to flow across said magnetoresistive layer, upper and under gap layers placed over and beneath said pair of electrodes and said magnetoresistive layer, and upper and under shield layers, one of which placed over said upper gap layer and the other placed beneath said under gap layer, wherein at least either of said upper and under gap layers is made of varistor material;
wherein said magnetoresistive head employs a material which exhibits varistor characteristics and is multi layered structure made up of Al2O3, SiO2, Ta2O5, Bi2O5, MnO, NiO, CoO, Fe—O, TiO2, HfO2, ZrO2, or Nb2O5 films or oxide films whose main element is one of these substances in combination with films selected from among ZnO, SiC, BaTiO, Si, and SrTiO films as the above varistor material; and
wherein said material is formed in a multi-layer wherein the thickness of a film made of Al2O3, SiO2, Ta2O5, Bi2O5, MnO, NiO, CoO, Fe—O, TiO2, HfO2, ZrO2, or Nb2O5 or an oxide film whose main element is one of these substances is 5 nm or less.

6. A magnetoresistive head, comprising a magnetoresistive layer which converts magnetic signals to electric signals, a pair of electrodes for allowing an electrically sensing current to flow across said magnetoresistive layer, upper and under gap layers placed over and beneath said pair of electrodes and said magnetoresistive layer, and upper and under shield layers, one of which is placed over said upper gap layer and the other is placed beneath said under gap layer, wherein leads of said upper and under shield layers and leads extended out of lead terminals of said electrodes are connected by varistor material on the side where a magnetoresistive element does not exist, when viewed from the lead terminals of said pair of electrodes;

wherein said magnetoresistive head employs a material which exhibits varistor characteristics and is multi layered structure made up of $Al_2O_3$, $SiO_2$, $Ta_2O_5$, $Bi_2O_5$, MnO, NiO, CoO, Fe—O, $TiO_2$, $HfO_2$, $ZrO_2$, or $Nb_2O_5$ films or oxide films whose main element is one of these substances in combination with films selected from among ZnO, SiC, BaTiO, Si, and SrTiO films as the above varistor material; and wherein said material is formed in a multi-layer wherein the thickness of a film made of $Al_2O_3$, $SiO_2$, $Ta_2O_5$, $Bi_2O_5$, MnO, NiO, CoO, Fe—O, $TiO_2$, $HfO_2$, $ZrO_2$, or $Nb_2O_5$ or an oxide film whose main element is one of these substances is 5 nm or less.

7. A magnetic head assembly comprising the magnetoresistive head according to claim 1 in combination with an inductive thin-film head.

8. A magnetic read/write device with the magnetic head assembly according to claim 7 installed thereon.

* * * * *